United States Patent
Mitchell et al.

(10) Patent No.: US 6,394,139 B1
(45) Date of Patent: May 28, 2002

(54) ELLIPTICAL EXPANSION PLUG FOR UNIVERSAL NOZZLE CASTING

(75) Inventors: Thomas O. Mitchell, Maryland Heights; Gordon R. Coates, III, Augusta, both of MO (US)

(73) Assignee: Husky Corporation, Pacific, MO (US)

( * ) Notice: Subject to any disclaimer, the term of this patent is extended or adjusted under 35 U.S.C. 154(b) by 0 days.

(21) Appl. No.: 09/625,020

(22) Filed: Jul. 27, 2000

(51) Int. Cl.⁷ .................................................. F16L 55/10
(52) U.S. Cl. ........................................... 138/89; 138/92
(58) Field of Search ..................................... 138/89, 92

(56) References Cited

U.S. PATENT DOCUMENTS

| | | | | |
|---|---|---|---|---|
| 291,771 A | * | 1/1884 | Rasgorshek | 138/92 |
| 1,058,210 A | * | 4/1913 | Welch | 138/89 |
| 2,139,491 A | * | 12/1938 | Dawson | 138/89 |
| 2,948,959 A | * | 8/1960 | Bowes | 138/89 |
| 3,550,637 A | * | 12/1970 | Briden | 138/92 |
| 3,672,532 A | * | 6/1972 | Becker | 138/89 |
| 3,724,505 A | * | 4/1973 | Jahn | 138/92 |
| 3,755,977 A | * | 9/1973 | Lewis | 138/92 |
| 4,262,701 A | * | 4/1981 | Beacom | 138/89 |
| 4,494,670 A | | 1/1985 | Barone | |
| 4,750,457 A | | 6/1988 | Bonutti | |
| 4,930,459 A | | 6/1990 | Coffenberry | |
| 5,307,848 A | * | 5/1994 | Murray | 141/44 |
| 5,476,125 A | | 12/1995 | Mitchell | |
| 5,482,094 A | | 1/1996 | Mitchell | |
| 5,562,133 A | | 10/1996 | Mitchell | |

* cited by examiner

Primary Examiner—James Hook
(74) Attorney, Agent, or Firm—Paul M. Denk

(57) ABSTRACT

An elliptical expansion plug for plugging elliptical openings. The elliptical expansion plug has a concave inner surface and a convex outer surface sized to allow hand-fitting within an elliptical hole to be plugged. The size of the elliptical expansion plug is such that the elliptical expansion plug generally matches the shape of the elliptical opening to be plugged, and further sized to provide a continuous seal between the outer edge of the elliptical expansion plug and the inner surface of the elliptical opening to be plugged after installation of the elliptical expansion plug. When the convex outer surface is eliminated by deforming the elliptical expansion plug with tools such as a hammer and punch until the convex outer surface is flat, the outer edge of the elliptical expansion plug comes into continuous contact with, and provides a continuous seal against, the inside circumference of the elliptical opening to be plugged.

6 Claims, 2 Drawing Sheets

ELLIPTICAL EXPANSION PLUG FOR UNIVERSAL NOZZLE CASTING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to elliptical expansion plugs that are designed to seal elliptical holes in castings.

Circular expansion plugs have been used for many years to seal circular openings in castings. A common application for expansion plugs is the use of a circular expansion plug to seal a circular freeze plug opening in an automobile engine block. While a number of designs for expansion plugs have been patented, such as U.S. Pat. No. 4,750,457 by Bonutti and U.S. Pat. No. 4,494,670 by Barone, these patents identify the use of circular expansion plugs. This is because past practice in making metal castings dictated that openings within the castings be circular. Following an assembly or machining operation, the circular opening in the casting is then sealed with a circular expansion plug.

Circular expansion plugs are typically produced with a single radius. By maintaining a constant radius the expansion plug's sealing edges will be in the same plane. To install a circular expansion plug, the expansion plug is normally set onto a counter bore in the circular hole in the casting and then flattened. Flattening the concave circular expansion plug forces the outer edges of the plug to seal against the inside of the circular hole.

The expansion plug openings in the past have virtually always been round in shape due to the ease in machining a round hole. If a passage that is 1" tall and 2" wide needs to be sealed, a circular plug having a diameter of 2" or more must be used despite the fact the opening to be sealed only requires a plug about 1" tall. Thus, due to past limitations in machining castings, the opening in the casting had to be round and therefore, the plug had to be of a size to fit the largest dimension of the opening in the casting.

However, due to the dimensional limitations of some casting applications and the need for special internal features in some castings, a circular hole may be either too large or will interfere with the various features of the casting. By utilizing an elliptical hole in conjunction with an elliptical expansion plug, the sealing area can be extended into a rectangular section versus a square or round section, as required with circular expansion plugs. As with a concave circular expansion plug, flattening a concave elliptical expansion plug also forces the outer edge of the plug to seal against the elliptical counter bored hole.

With the advent of Computer-Numerically Controlled ("CNC") machining, almost any hole shape can be machined into a casting, including elliptical shaped holes. This advent of modern machining practices requires that new shapes and styles of plugs be designed to fit these new hole shapes. In the previous example, the 1" tall by 2" wide passage in the casting can now be matched with an elliptical hole machined or cast into the casting, the machining being accomplished by a computer controlled machining tool. To properly plug this elliptical hole, a properly designed elliptical expansion plug must now be used. In this example, an elliptical plug would be approximately 1.750" tall and 2.500" wide would be used to plug the elliptical hole in the machined casting.

The object of this invention is to provide a means to seal an elliptical opening formed or machined into a casting. In accordance with this objective, this invention contemplates an elliptical expansion plug for sealing elliptical openings within a casting. The plug includes an elliptical shape having a major axis and a minor axis, a concave surface is produced by varying the radii between the minor and major diameters so as to maintain the sealing edge in a single plane. For the sealing edge on a circular expansion plug to work properly, when the plug is flattened (installed), the forces around the circumference needs to be the same. The same holds true with the elliptical expansion plug. Since the radius of the curvature varies from the major axis to the minor axis, the minor axis of the hole is a little bit bigger with respect to the expansion plug than the major axis of the hole, with respect to the expansion plug, thus equal sealing force is achieved.

BRIEF SUMMARY OF THE INVENTION

The present invention resides in a concave elliptical expansion plug. The shape of the concaved elliptical expansion plug is determined by matching the major axis and minor axis of the elliptical expansion plug with the elliptical shape of the elliptical opening to be plugged within the casting. The essence of the invention, though, is that by expanding the casting into the form of the elliptical feature as shown in the drawings, the casting can become a more universal style of casting that may be used for many different styles of fuel dispensing nozzles. For example, with the elliptical plug, the handle casting can be used for the standard type of fuel dispensing nozzle. But in addition, the same type of casting, because of the extended length that it attains for the nozzle, can be used, without further modification, for housing the various components that are used in the automatic shut-off nozzle, and likewise, the same type of casting can be used for a nozzle that incorporates the various features for providing vapor recovery systems, through the nozzle, where that type of fuel dispensing is required by code. Essentially the nozzle casting becomes universal for various types of nozzles that are now currently used in the industry, to construct fuel dispensing nozzles, thereby eliminating the need to have three different types of castings, for fuel dispensing nozzles, that currently prevails in the trade.

BRIEF DESCRIPTION OF THE SEVERAL VIEWS OF THE DRAWINGS

The objects of the invention are achieved as set forth in the illustrative embodiments shown in the drawings which form a part of the specification.

DETAILED DESCRIPTION OF THE INVENTION

The following detailed description illustrates the invention by way of example and not by way of limitation. This description will clearly enable one skilled in the art to make and use the invention, and describes more than one embodiment, adaptation, variation, alternative or use of the invention, including the best mode of carrying out the invention.

Figure 1:
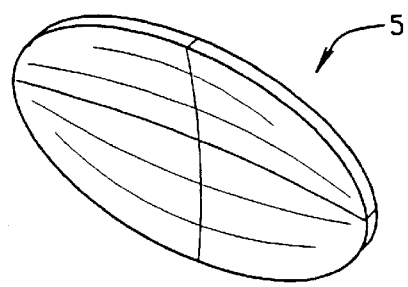
FIG. 1 is a perspective view of a typical concave elliptical expansion plug.
Figure 2:
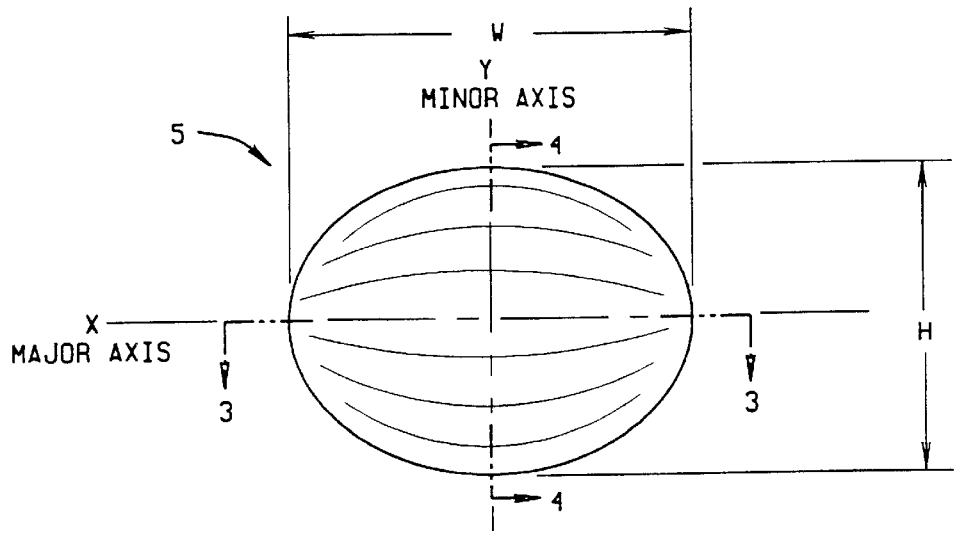
FIG. 2 is a front view of a typical concave elliptical expansion plug.

Referring now to the drawings, FIG. 1 shows a perspective view of one embodiment of the elliptical expansion plug 5. The vertical centerline (minor axis) of the elliptical expansion plug is designated by the letter Y and the horizontal centerline (major axis) of the elliptical expansion plug 5 is designated by the letter X. In FIG. 2 a front view of the elliptical expansion plug 5 is shown where the overall height of the elliptical expansion plug 5 along the vertical centerline is defined by the letter H, while the horizontal width of the elliptical expansion plug 5 is defined by the letter W The major concave diameter of the elliptical expansion plug 5 is designated by the letter R1 and the minor concave diameter of the elliptical expansion plug 5 is designated by the letter R2. Section line 3–3 indicates the section cut line used to create the major axis the section view of the elliptical expansion plug 5 shown in FIG. 3. Section line 4–4 indicates the section cut line used to create the minor axis view of the elliptical expansion plug 5 shown in FIG. 4.

Figure 3:
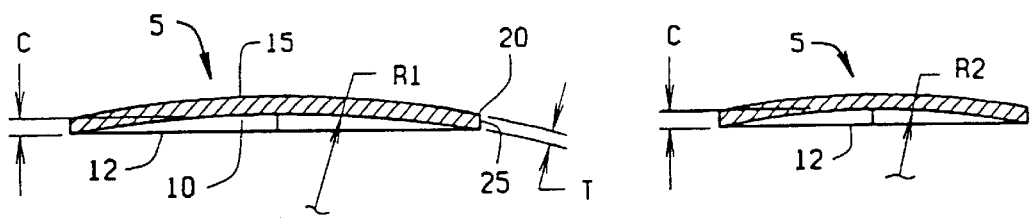
FIG. 3 is a section view of a typical concave elliptical expansion plug.
Figure 4:
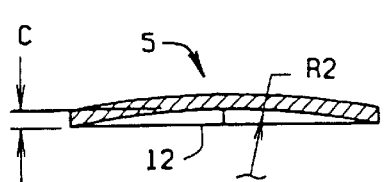
FIG. 4 is a perspective view of a typical concave elliptical expansion plug as it would be installed in a typical casting having an elliptical expansion plug opening.

In FIG. 3 a cross section of the elliptical expansion plug 5 is shown taken along the section line 3–3 which shows a concave inner surface 10, a convex outer surface 15 and an edge 20. The concave inner surface 10 is radially aligned with the convex outer surface 15. The edge surface 25 is generally perpendicular to the flat surface defined by the bottom edge of surface 25. The amount of concavity required for the elliptical expansion plug shown in this particular embodiment is indicated by the letter C. Generally, the amount of concavity C is such that the edge surface 25 will create a continuous seal against, and align axially with, the inside of any opening being plugged, when the concavity of the elliptical expansion plug 5 is eliminated by deforming the elliptical expansion plug 5. The thickness of the elliptical expansion plug is indicated by the letter T.

Figure 5:
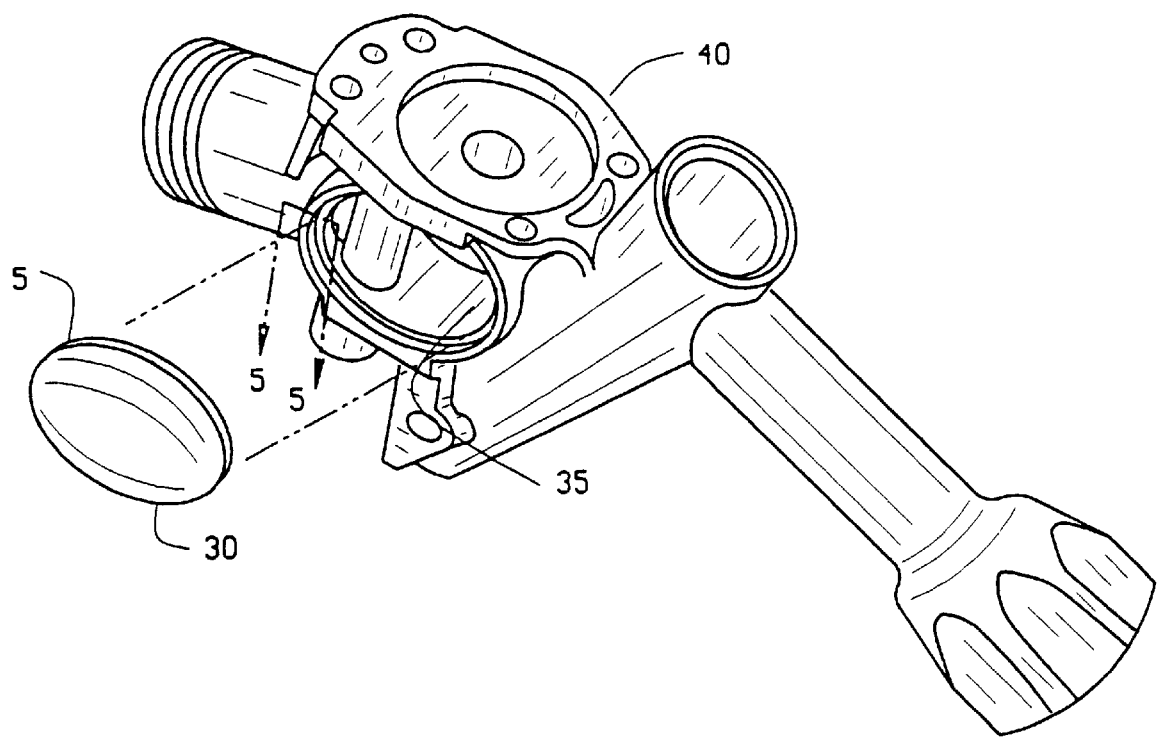
FIG. 5 is a cross section view of the elliptical expansion plug as it would be installed within a nozzle casting
Figure 6:
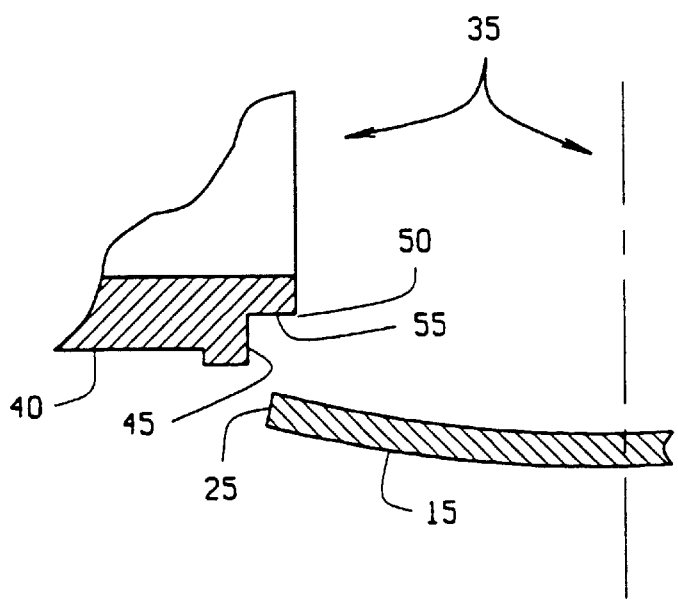
FIG. 6 is a view of the cross section along 5—5 of FIG. 5.

In the embodiment shown in FIG. 5, the elliptical expansion plug 5 is used to seal an elliptical cavity in an aluminum casting for a nozzle casting 40. While the elliptical expansion plug 5 in this embodiment is constructed of a soft metal such as, for example, ASTM 1100-H14 aluminum, any other malleable material, such as a polymer based material, may be used. The expansion plug 5 includes an annular rim 30 whose external diameter is slightly less than the size of the elliptical opening 35 of the nozzle casting 40 in which the elliptical expansion plug 5 is to be assembled. The major diameter R1 and the minor diameter R2 of the elliptical expansion plug 5 is sized to allow the elliptical expansion plug 5 to be hand-fitted into the elliptical opening 35 of the nozzle casting 40 while still providing a continuous seal between the edge surface 25 and the annular recessed surface 45 (FIG. 6) of the elliptical opening to be plugged. FIG. 6 shows that the elliptical opening 35 has an annular recessed surface 45 parallel to the axis of the elliptical opening 35 and at a depth slightly greater than the thickness T of the elliptical expansion plug 5. This annular recessed surface 45 ends at an annular lip 50, with the annular lip 50 having a mounting surface 55 perpendicular to the annular recessed surface 45 and extending into the elliptical opening 35 to a dimension about the same thickness T of the elliptical expansion plug 5.

It is preferred that the major diameter R1 in FIG. 3 of elliptical expansion plug 5 be about 0.5% smaller than the major axis of the elliptical opening 35 and that the minor diameter R2 of the elliptical expansion plug 5 be about 0.3% smaller than the minor diameter of the elliptical hole 35 in the nozzle casting 40. This will ensure that the elliptical expansion plug 5 can be hand-fitted into the elliptical opening 35 of the nozzle casting 40.

To install the elliptical expansion plug 5, the elliptical expansion plug is placed within the elliptical opening 35 (FIG. 4), with the convex outer surface 15 facing outward from the side of the nozzle casting 40. The elliptical expansion plug 5 is inserted into the elliptical opening 35 until the edge 25 of the elliptical expansion plug 5 comes into contact with mounting surface 55 of the annular lip 50.

After hand-fitting the elliptical expansion plug 5 into the elliptical opening 35 of the nozzle casting 40, it is necessary that tools, such as a hammer and punch, be used to eliminate the concavity C of the elliptical expansion plug 5 by deforming the outside surface 15 until the outer concave surface is relatively flat, thereby sealing the elliptical opening 35 in the nozzle casting 40 by forcing the edge 25 of the elliptical expansion plug 5 tightly against the inside surface 45 of the elliptical opening 35.

It is obvious that the forming of the elliptical expansion plug 5 can be accomplished in a number of ways. In one embodiment, a flat blank is formed by stamping the blank from a sheet of soft metal material such as aluminum. In a second step, the flat blank is then placed into a die wherein a second stamping produces the concave surface. In yet another embodiment, the stamping out of the blank and the forming of the concave surface may be accomplished by a two-stage punching die which cuts out the blank and forms the concave surface within a single stamping.

As various changes could be made in the above constructions without departing from the scope of the invention, it is intended that all matter contained in the above description or shown in the accompanying drawings shall be interpreted as illustrative and not in a limiting sense.

In view of the above, it will be seen that the several objects and advantages of the present invention have been achieved and other advantageous results have been obtained.

What is claimed is:

1. A universal nozzle casting for use for accommodating the operating components for providing both routine dispensing of fuel, automatic shut-off, and vapor recovery systems, said nozzle casting incorporating an elliptical opening laterally of the casting and which provides access to the interior of the nozzle casting for accommodating the insertion, replacement, or removal of its various operating components, said operating components being of varying sizes depending upon the type of nozzle being assembled, said elliptical opening accommodating an elliptical expansion plug, the elliptical expansion plug being made of a malleable material having a thickness, a concaved inner surface radially aligned with a convex outer surface of the integral plug, an edge around the circumference of the elliptical plug, the edge having an edge surface generally perpendicular to the inner concave surface and the outer convex surface of said elliptical plug, the elliptical plug has an amount of concavity such that, when the concavity of the elliptical plug is eliminated by deforming the convex outer surface of the elliptical plug, the edge surface will seal against, and align actually with, an inside surface of the elliptical opening to be plugged, the elliptical plug has an angular rim whose external diameter is slightly less than the size of the elliptical opening to be plugged, a major diameter and a minor diameter of the elliptical expansion plug is sized to allow the elliptical plug to be hand-fitted into the elliptical opening to be plugged, thereby allowing the nozzle casting to be applied for reception of various size operating components to provide for said routine dispensing of fuel regardless which style of nozzle is assembled.

2. The elliptical expansion plug of claim 1 wherein the malleable material is ASTM 1100-H14 aluminum.

3. The elliptical expansion plug of claim 2 wherein the major diameter of the elliptical plug is about 0.5% smaller than the major axis of the elliptical opening to be plugged and the minor diameter of the elliptical plug is about 0.3% smaller than the minor diameter of the elliptical hole to be plugged.

4. The elliptical expansion plug of claim 1 wherein the malleable material is a polymer.

5. The elliptical expansion plug of claim 1 wherein the elliptical opening to be plugged includes an annular recessed surface parallel to the axis of the elliptical opening to be plugged, the annular recessed surface continuing from an outer edge of the elliptical opening to be plugged, inwardly to a depth slightly greater than the thickness of the elliptical plug, the annular recessed surface ending at an annular lip, the annular lip having a surface perpendicular to the annular recessed surface and extending into the elliptical opening to a dimension about equal to the thickness of the elliptical expansion plug.

6. The universal nozzle casting of claim 1 wherein the nozzle casting having elliptical openings provided to either side for attaining access to its internal operating components, and one of said elliptical plugs being inserted for installation within each nozzle lateral opening to provide permanent closure thereto.

* * * * *